(12) United States Patent
Kobayashi et al.

(10) Patent No.: US 10,567,614 B2
(45) Date of Patent: Feb. 18, 2020

(54) PROCESSING APPARATUS, PROCESSING METHOD, AND RECORDING MEDIUM FOR STORING PROCESS PROGRAM TO PROCESS IMAGE DATA OBTAINED BY READING VOUCHER

(71) Applicant: SEIKO EPSON CORPORATION, Tokyo (JP)

(72) Inventors: Masayuki Kobayashi, Fumiji-machi (JP); Norihiko Yamada, Nagano (JP); Takayuki Ato, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/129,848

(22) Filed: Sep. 13, 2018

(65) Prior Publication Data
US 2019/0089863 A1    Mar. 21, 2019

(30) Foreign Application Priority Data

Sep. 15, 2017 (JP) .................................. 2017-177420

(51) Int. Cl.
| | |
|---|---|
| *G06F 3/12* | (2006.01) |
| *H04N 1/32* | (2006.01) |
| *G06K 9/00* | (2006.01) |
| *G07F 7/04* | (2006.01) |
| *G06Q 20/04* | (2012.01) |

(52) U.S. Cl.
CPC ....... *H04N 1/32133* (2013.01); *G06F 3/1204* (2013.01); *G06F 3/1267* (2013.01); *G06K 9/00154* (2013.01); *G06K 9/00442* (2013.01); *G06Q 20/042* (2013.01); *G07F 7/04* (2013.01); *G06Q 20/045* (2013.01); *H04N 2201/3205* (2013.01); *H04N 2201/3271* (2013.01)

(58) Field of Classification Search
None
See application file for complete search history.

(56) References Cited

U.S. PATENT DOCUMENTS

| | | | | |
|---|---|---|---|---|
| 2006/0221405 | A1* | 10/2006 | Matsumoto | G06F 21/64 358/402 |
| 2007/0211288 | A1* | 9/2007 | Uejo | H04N 1/32122 358/1.16 |
| 2016/0150103 | A1* | 5/2016 | Kobayashi | G06F 3/1204 358/1.15 |
| 2017/0092062 | A1* | 3/2017 | Tsutsui | G07F 17/3246 |

FOREIGN PATENT DOCUMENTS

JP      2016-099819 A     5/2016

* cited by examiner

*Primary Examiner* — Henok Shiferaw
(74) *Attorney, Agent, or Firm* — Global IP Counselors, LLP

(57) ABSTRACT

There is provided a main server which includes an acquisition unit that acquires voucher image data obtained by reading a voucher, a reception unit that receives designation as to whether or not to assign a timestamp to the voucher image data, a TS assignment processing unit that performs processing for assigning the timestamp to the voucher image data in a case where the reception unit receives designation to assign the timestamp, and a notification unit that performs notification that prompts a user to designate as to whether or not to assign the timestamp, when a first deadline which is set for the voucher image data arrives in a case where the reception unit does not receive the designation as to whether or not to assign the timestamp.

13 Claims, 12 Drawing Sheets

PROCESSING APPARATUS, PROCESSING METHOD, AND RECORDING MEDIUM FOR STORING PROCESS PROGRAM TO PROCESS IMAGE DATA OBTAINED BY READING VOUCHER

BACKGROUND

1. Technical Field

The present invention relates to a processing apparatus that performs processing on image data obtained by reading a voucher, a processing method, and a recording medium for storing a process program.

2. Related Art

In the related art, there is known a printing system that acquires image data obtained by reading an original, transmits acquired image data to a storage server, and transmits print data based on image data to a printer designated in advance (see, for example, JP-A-2016-099819). According to the printing system, for example, voucher image data obtained by reading a receipt or the like can be stored in the storage server or a copy of a receipt or the like can be issued from a printer of an accounting office or the like.

In the meanwhile, a timestamp is known as a technique for certifying reliability and safety of the voucher image data as described above. Also, for example, in the electronic book preservation law, as it is required that after receipt of a receipt or invoice, a person assigns a timestamp within a predetermined period after signing the receipt or invoice, in the voucher image data, there is a case where a predetermined deadline for assignment is defined as a period for which timestamp is to be assigned. However, in the printing system described in JP-A-2016-099819, since the timestamp assignment deadline is not taken into consideration, in a case where a user forget to designate to assign the timestamp to the voucher image data, there is a concern that the timestamp assignment deadline may be passed.

SUMMARY

An advantage of some aspects of the invention is to provide a processing apparatus capable of properly assigning a timestamp within a predetermined deadline for assignment, a processing method, and a process program.

According to an aspect of the invention, there is provided a processing apparatus which includes an acquisition unit that acquires voucher image data obtained by reading a voucher, a reception unit that receives designation as to whether or not to assign a timestamp to the voucher image data, a processing unit that performs processing for assigning the timestamp to the voucher image data in a case where the reception unit receives designation to assign the timestamp, and a notification unit that performs notification that prompts a user to designate as to whether or not to assign the timestamp, when a first deadline which is set for the voucher image data arrives in a case where the reception unit does not receive the designation as to whether or not to assign the timestamp.

According to another aspect of the invention, there is provided a processing method executed by a computer which includes acquiring voucher image data obtained by reading a voucher, receiving designation as to whether or not to assign a timestamp to the voucher image data, in the receiving, performing processing for assigning the timestamp to the voucher image data in a case where the reception unit receives designation to assign the timestamp, and in the receiving, performing notification that prompts a user to designate as to whether or not to assign the timestamp, when a first deadline which is set for the voucher image data arrives in a case where the reception unit does not receive the designation as to whether or not to assign the timestamp.

According to still another aspect of the invention, there is provided a computer-readable recording medium that stores a process program, that when executed, causes a computer to execute a process, the process includes acquiring voucher image data obtained by reading a voucher, receiving designation as to whether or not to assign a timestamp to the voucher image data, in the receiving, performing processing for assigning the timestamp to the voucher image data in a case where the reception unit receives designation to assign the timestamp, and in the receiving, performing notification that prompts a user to designate as to whether or not to assign the timestamp, when a first deadline which is set for the voucher image data arrives in a case where the reception unit does not receive the designation as to whether or not to assign the timestamp.

In the configurations, when a first deadline set for the voucher image data arrives in a case where the reception unit does not receive the designation as to whether or not to assign the timestamp, the notification that prompts the user to designate as to whether or not to assign the timestamp is to be assigned and thus, the notified user may notice that he/she is not designating. With this, it is possible to prevent the user from unintentionally passing the timestamp assignment deadline and eventually, it is possible to appropriately assign a TS within the TS assignment deadline.

The first deadline is assumed to be a deadline that comes before the timestamp assignment deadline.

The notification unit (notifying step) may transmit e-mail or may display the e-mail on a predetermined Web site, as a method of notifying that prompts the user to designate as to whether or not to assign the timestamp. In addition, notification may be made by a method such as generating electronic sound or vibration on a customer terminal or the like possessed by the user.

In the processing apparatus, the acquisition unit may acquire the voucher image data obtained by reading the voucher and receipt date information indicating a receipt date of the voucher, and the notification unit may set the first deadline based on the receipt date information.

In the configuration, the first deadline can be accurately set based on the acquired receipt date information.

In the processing apparatus, the notification unit may set the first deadline based on a date on which the acquisition unit acquires the voucher image data.

In the configuration, it is possible to set the first deadline without requiring a user's time and effort such as inputting the receipt date of the voucher. Also, it is possible to notify the user at an appropriate timing by providing a time limit from the time of receiving the voucher to the time of uploading the voucher image data, such as uploading the voucher image data on the day that the voucher was received.

In the processing apparatus, when a second deadline set for the voucher image data arrives after the first deadline has arrived in a case where the reception unit does not receive designation as to whether or not to assign the timestamp, the processing unit may perform processing for assigning the timestamp to the voucher image data.

In the configuration, it is possible to reliably prevent omission of assigning the timestamp to the acquired voucher image data.

The second deadline is assumed to be a deadline that arrives after the first deadline and a deadline that arrives before the timestamp assignment deadline.

In the processing apparatus, the notification unit may perform the notification by transmitting e-mail including access information for accessing a designation screen for designating to assign the timestamp to the voucher image data.

In the configuration, the user may easily access the designation screen for designating as to whether or not to assign the timestamp, by using the access information included in received e-mail.

In the processing apparatus, the acquisition unit may acquire the voucher image data and identification information of a user who provided the voucher image data, and the notification unit may refer to a storing unit in which the identification information of the user and e-mail address are stored in association with each other and transmit the e-mail to the e-mail address associated with the identification information of the user who provided the voucher image data.

In the configuration, the user may save the time and effort for designating the e-mail address for receiving the e-mail every time the user provides the voucher image data.

In the processing apparatus, a signature determination unit that analyzes an image of the voucher image data acquired by the acquisition unit and determines the presence or absence of signature and a warning unit that issues a warning in a case where it is determined that there is no signature may be further included.

In the configuration, in a case where it is necessary to sign a voucher, omission of a signature may be prevented.

In the processing apparatus, in a case where the processing unit performs processing for assigning the timestamp, the processing unit may include a charging processing unit that performs charging processing.

In the configuration, it is possible to earn profit with charging processing.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
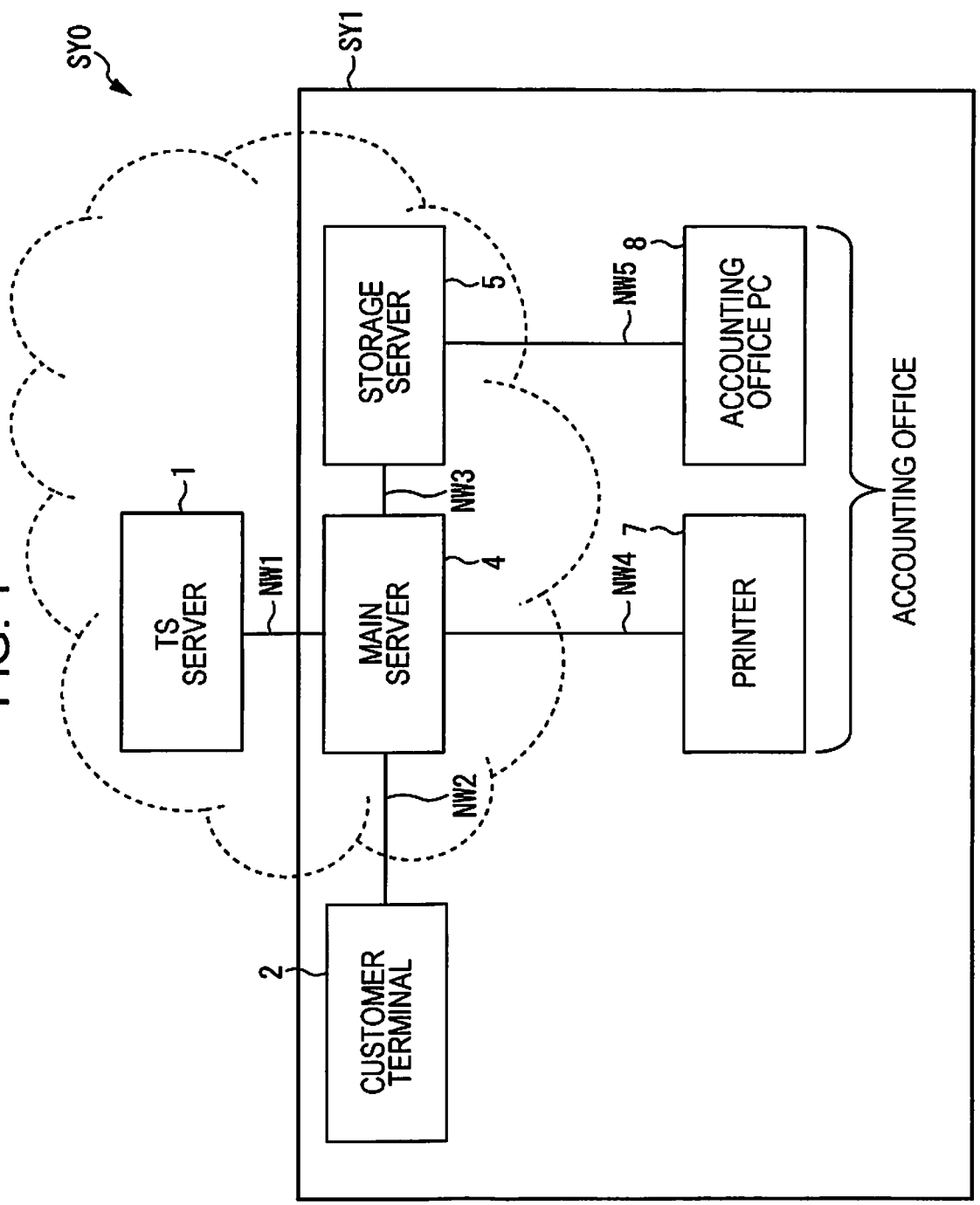
FIG. 1 is a system configuration diagram of a network system according to an embodiment of the invention.

Hereinafter, embodiments of the processing apparatus, the processing method, and the process program of the invention will be described with reference to the accompanying drawings. FIG. 1 is a system configuration diagram of a network system SY0 according to an embodiment of the invention. The network system SY0 includes a timestamp server (hereinafter, timestamp is denoted by "TS") 1 and a processing system SY1. The TS is time certification information for certifying that electronic data existed at a certain time and that electronic data was not altered at and after that time. In the present embodiment, the TS is used to certify the authenticity of image data (hereinafter referred to as "voucher image data") obtained by reading a voucher such as a receipt 90 (see FIG. 8) or a bill.

The TS server 1 provides a TS service such as issuance of the TS and certification of validity of the voucher image data based on the TS. Although not specifically illustrated, the TS server 1 is connected to a time distribution server that distributes time information conforming to standard time, and provides the TS service based on time information received from the time distribution server. In the present embodiment, it is assumed that the deadline for assignment for assigning the TS to the voucher image data is prescribed within 3 days from the day following the receipt date of the voucher. It is assumed that a recipient of the voucher is prescribed to sign the voucher with a handwriting autograph and then, to read the voucher.

The processing system SY1 includes a customer terminal 2, a main server 4, a storage server 5, a printer 7, and an accounting office PC (personal computer) 8. The customer terminal 2 is an example of an "information processing terminal" of the invention. The main server 4 is an example of a "processing apparatus" of the invention.

As illustrated in FIG. 1, the TS server 1 and the main server 4 are connected via a first network NW 1 and the customer terminal 2 and the main server 4 are connected via a second network NW 2. The main server 4 and the storage server 5 are connected via a third network NW 3, the main server 4 and a printer 7 are connected via a fourth network NW 4, and the storage server 5 and the accounting office PC 8 are connected via a fifth network NW 5.

In the present embodiment, since it is assumed that a cloud server is used as the TS server 1, the main server 4, and the storage server 5, an Internet communication network is used as the networks NW 1 to NW 5, but other communication networks may be used. The networks NW 1 to NW 5 may be not a common network but a different network. Each of the networks NW 1 to NW 5 may be realized by combining a plurality of networks. The communication form of the network may be wireless communication or wired communication.

In the present embodiment, it is assumed that the main server 4 and the storage server 5 are operated and managed by a voucher reading service provider that provides a voucher reading service. The "voucher reading service" refers to a service for accounting office including management of voucher image data and processing on the voucher image data. On the other hand, the printer 7 and the accounting office PC 8 are installed in an accounting office contracted with the voucher reading service provider, and the customer terminal 2 is assumed to be used by an employee (hereinafter referred to as "user") of an adviser company of the accounting office.

The customer terminal 2 reads the voucher using a camera function and uploads voucher image data as the reading result to the main server 4. After signing the voucher, the user (recipient of the voucher) performs a voucher reading operation and a voucher image data upload operation using the customer terminal 2. At this time, the user does not need to determine whether or not to assign the TS to the voucher image data, and performs designation as to whether or not to assign the TS in a designation screen D1 (see FIG. 10) to be described later. With this, the user can perform designation of assigning the TS collectively on the designation screen D1 for a plurality of pieces of voucher image data). With this, it is possible for the user to determine whether or not to assign the TS with a margin. That is, in a case where the user mistakenly uploads voucher image data of a voucher (for example, a receipt for personal use) that should not be applied, the user can designate not to assign the TS on the designation screen D1. Since it is possible to designate not to assign the TS on the designation screen D1 as described above, it is possible to prevent the main server 4 from performing processing for unnecessarily assigning the TS to the voucher image data that should not be applied. Hereinafter, processing for assigning the TS is referred to as "TS assignment processing".

The main server 4 acquires the voucher image data uploaded from the customer terminal 2 and determines the presence or absence of a signature. In a case where it is determined that there is a signature, the main server 4 stores the voucher image data in a voucher image data DB 45*c*. On the other hand, in a case where it is determined that there is no signature, a warning is issued to the customer terminal 2. In a case where designation to assign the TS is made for any one of the pieces of voucher image data stored in the voucher image data DB 45*c*, the main server 4 performs TS assignment processing. Even in a case where designation to assign the TS to the voucher image data is not made, when a predetermined deadline (hereinafter, referred to as "second deadline") arrives based on the receipt date of the voucher, TS assignment processing is performed in order to prevent omission of assigning the TS. In the present embodiment, since the TS assignment deadline is prescribed within 3 days from the day following the receipt date of the voucher, the second deadline is, for example, noon on the third day from the day following the receipt date of the voucher. The TS assignment deadline is prescribed by laws and regulations and the like, and it is preferable to be able to change the setting of the TS assignment deadline in accordance with changes in laws and regulations and the like.

Before the second deadline arrives, the main server 4 notifies the user to prompt an operation to designate whether or not to assign the TS to the voucher image data. Hereinafter, this notification is referred to as a "TS designation operation notification". That is, when a predetermined deadline (hereinafter, referred to as a "first deadline") based on the voucher receipt date arrives in a case where designation to assign the TS to the voucher image data is not made, the main server 4 performs the TS designation operation notification. The first deadline is, for example, noon on the second day from the day following the receipt date of the voucher.

After performing TS assignment processing on the voucher image data, the main server 4 performs OCR processing, extracts necessary information from the OCR processing result, and generates processing data. The main server 4 outputs a voucher file which includes uploaded voucher image data, TS data assigned by the TS server 1 to the voucher image data, and the processing data to the storage server 5. The storage server 5 acquires the voucher file from the main server 4 and stores the voucher file in a voucher file database 55*b* (hereinafter, a database is denoted by "DB", see FIG. 4).

The main server 4 generates print data based on the uploaded voucher image data, and outputs the uploaded voucher image data to the printer 7. The timing at which the main server 4 outputs print data to the printer 7 is immediately after generation of the print data, or when a print instruction is received from the customer terminal 2 or the accounting office PC 8, or the like.

The printer 7 prints a copy of the voucher based on the print data output from the main server 4. As the printer 7, a cloud printer capable of receiving print data via the Internet network (fourth network NW 4) is assumed. The accounting office PC 8 accesses the storage server 5 and acquires the voucher file stored in the voucher file DB 55*b*. The accounting office PC 8 performs accounting processing such as journalizing processing or the like based on the acquired voucher file (mainly processing data).

Figure 2:
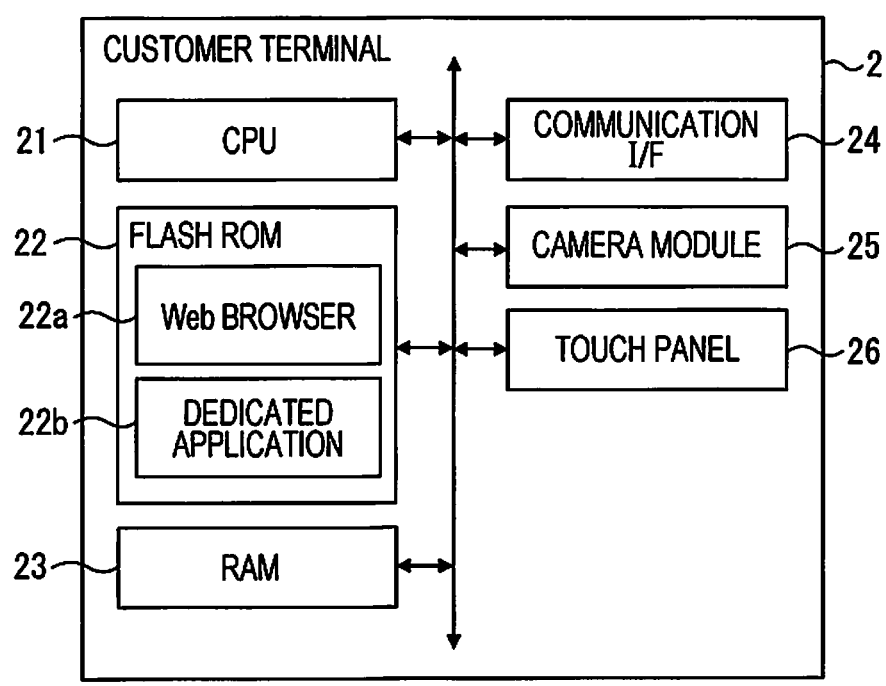
FIG. 2 is a block diagram illustrating a hardware configuration of a customer terminal.

Next, with reference to FIG. 2 to FIG. 6, a hardware configuration of each device constituting the processing system SY1 will be described. FIG. 2 is a block diagram illustrating a hardware configuration of the customer terminal 2. The customer terminal 2 is, for example, a smartphone, and includes a central processing unit (CPU) 21, a flash read only memory (ROM) 22, a random access memory (RAM) 23, a communication I/F (hereinafter, interface is denoted by "I/F") 24, a camera module 25, and a touch panel 26.

The CPU 21 inputs and outputs signals to and from each unit in the customer terminal 2, and performs various operation processing. The flash ROM 22 is a nonvolatile and rewritable storage medium, and stores a Web browser 22*a*, a dedicated application 22*b*, and the like, in addition to an operating system (OS). The web browser 22*a* is used for displaying a web page. The dedicated application 22*b* is used for uploading the voucher image data read by the camera module 25 to the main server 4. When the voucher image data is uploaded to the main server 4, the CPU 21 uploads the voucher image data by adding additional information thereto. The additional information includes receipt date information indicating the receipt date of the voucher. Details will be described later. On the other hand, the RAM 23 is a volatile storage medium and is used as a work area of the CPU 21.

The communication I/F 24 communicates with the main server 4 via the second network NW 2. The camera module 25 includes an imaging lens that forms a subject image and an imaging element that photo-electrically converts the subject image formed by the imaging lens. In the present embodiment, it is assumed that imaging is performed by the camera module 25 for each voucher. The touch panel 26 is integrally formed with a display and a touch type sensor, and is used as a display unit and an input unit.

Figure 3:
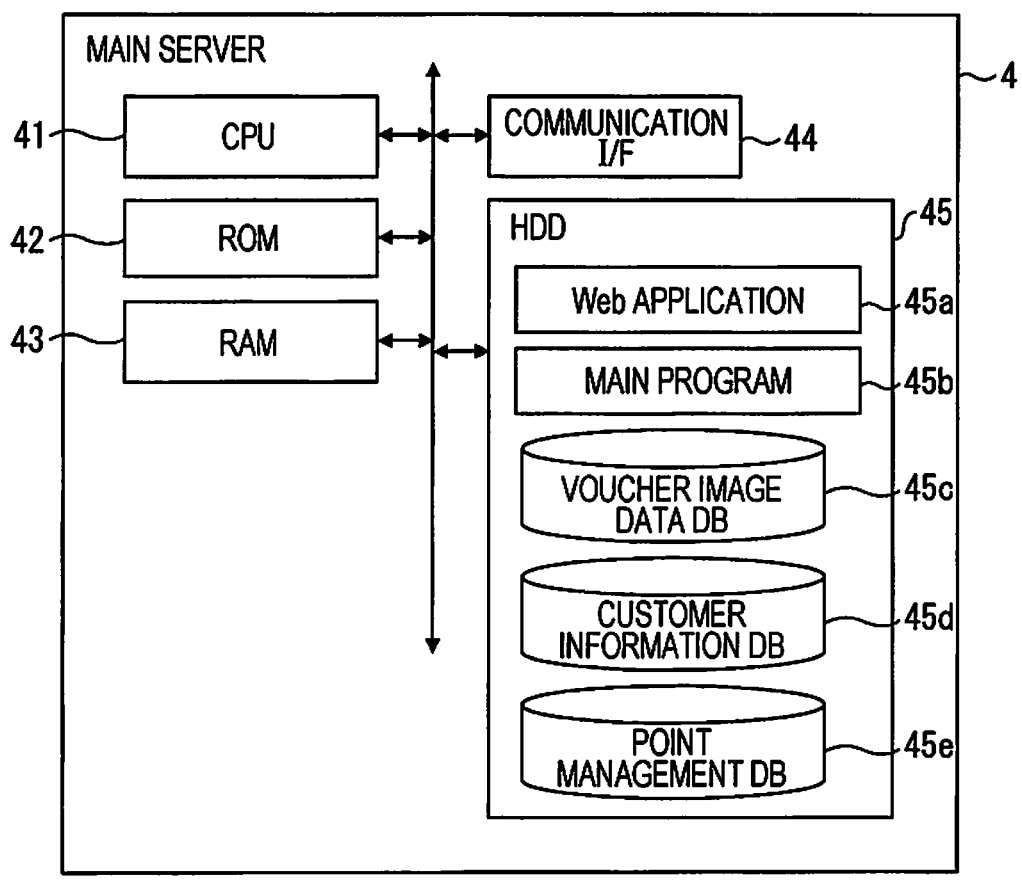
FIG. 3 is a block diagram illustrating a hardware configuration of a main server.

FIG. 3 is a block diagram illustrating a hardware configuration of the main server 4. The main server 4 includes a CPU 41, a ROM 42, a RAM 43, a communication I/F 44, and a hard disc drive (HDD) 45.

The CPU 41 inputs and outputs signals to and from each unit in the main server 4, and performs various operation processing. The ROM 42 is a nonvolatile storage medium and stores a program such as a basic input output system (BIOS). The RAM 43 is used as a work area of the CPU 41. The communication I/F 44 communicates with the TS server 1 via the first network NW 1 and communicates with the customer terminal 2 via the second network NW 2. The communication I/F 44 communicates with the storage server 5 via the third network NW 3 and communicates with the printer 7 via the fourth network NW 4. In a case where communication protocols of these networks NW are different, the communication I/F 44 includes a plurality of interfaces corresponding to respective communication protocols.

The HDD 45 is a nonvolatile auxiliary storage device and stores a Web application 45a, a main program 45b, a voucher image data DB 45c, a customer information DB 45d, a point management DB 45e, and the like, in addition to the OS. The customer information DB 45d is an example of the "storing unit" of the invention.

The Web application 45a is operated by the customer terminal 2 using the Web browser 22a (see FIG. 2). The Web application 45a mainly provides a Web page for the user of the customer terminal 2 to perform the uploading operation of the voucher image data.

The main program 45b is used for generating processing data, processing for outputting the voucher file to the storage server 5, and the like, in addition to the TS designation operation notification and TS assignment processing.

The voucher image data DB 45c stores the voucher image data uploaded from the customer terminal 2 and the additional information. The voucher image data and the additional information are read out and deleted at the time when designation to assign the TS is made from the user.

In the customer information DB 45d, identification information of the user (employee of the adviser company), a user's e-mail address, and an accounting office ID of the accounting office contracted with the adviser company are stored in association with each other. In the present embodiment, login information (user ID and password) is stored as user identification information. The e-mail address is a notification destination of the TS designation operation notification.

In the point management DB 45e, the remaining number of points assigned by the voucher reading service provider in accordance with the amount previously deposited from the accounting office is stored in association with the accounting office ID. The CPU 41 refers to the customer information DB 45d and specifies the accounting office ID from the login information of the user who uploaded the voucher image data. Then, the CPU 41 subtracts the point associated with a specified accounting office ID each time the TS assignment processing is executed.

In the point management DB 45e, the remaining number of points may be stored in association with the user ID (user ID specified from the login information) of the user who uploaded the voucher image data, instead of the accounting office ID. In this case, the CPU 41 subtracts the point associated with the specified user ID each time the TS assignment processing is executed. The CPU 41 may subtract a point not only with execution of the TS assignment processing but also with execution of the process data generating process.

Figure 4:
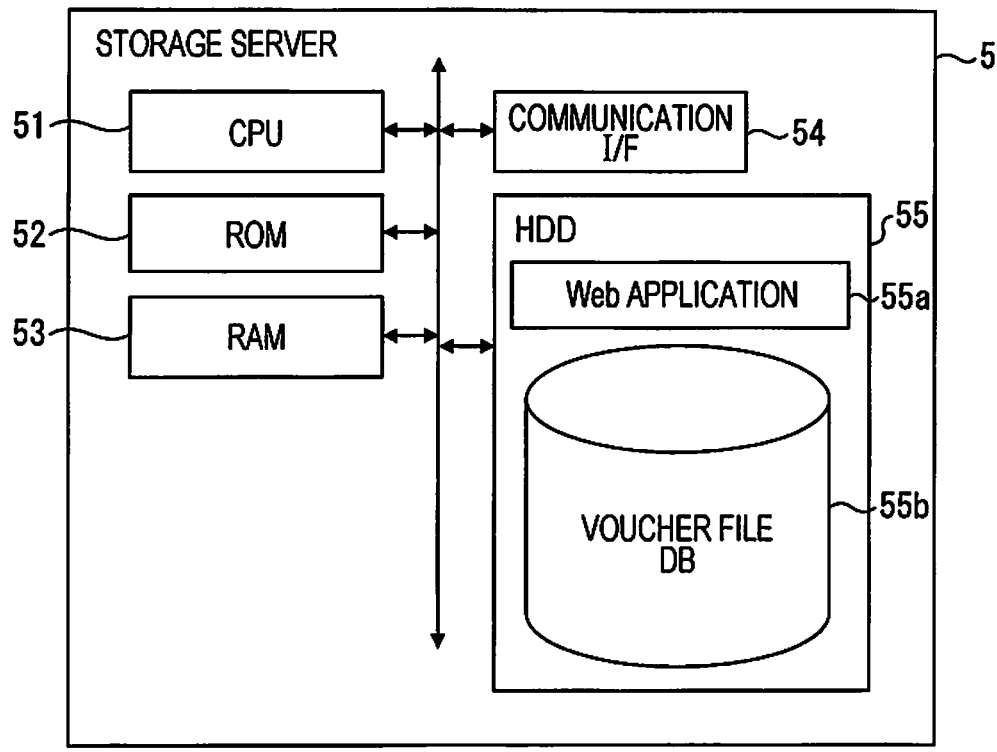
FIG. 4 is a block diagram illustrating a hardware configuration of a storage server.

FIG. 4 is a block diagram illustrating a hardware configuration of the storage server 5. The storage server 5 includes a CPU 51, a ROM 52, a RAM 53, a communication I/F 54, and an HDD 55.

The CPU 51 inputs and outputs signals to and from each unit in the storage server 5, and performs various operation processing. The ROM 52 stores programs such as the BIOS. The RAM 53 is used as a work area of the CPU 51. The communication I/F 54 communicates with the main server 4 via the third network NW 3 and communicates with the accounting office PC 8 via the fifth network NW 5. In a case where the communication protocols of the networks NW 3 and NW 5 are different, the communication I/F 54 includes a plurality of interfaces corresponding to respective communication protocols.

The HDD 55 stores the Web application 55a, the voucher file DB 55b, and the like in addition to the OS. The Web application 55a is operated by the accounting office PC 8 using a Web browser 84a (see FIG. 6). The Web application 55a mainly provides a Web page for a user of the accounting office PC 8 to search for a desired voucher file.

The voucher file DB 55b stores the voucher file acquired from the main server 4. As described above, the voucher file includes the voucher image data uploaded from the customer terminal 2, the TS data assigned to the voucher image data, and the processing data.

Figure 5:
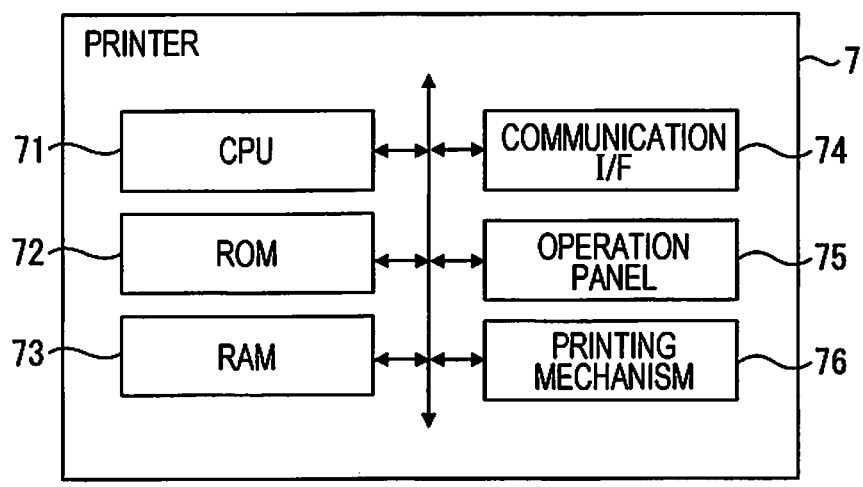
FIG. 5 is a block diagram illustrating a hardware configuration of a printer.

FIG. 5 is a block diagram illustrating a hardware configuration of the printer 7. The printer 7 includes a CPU 71, a ROM 72, a RAM 73, a communication I/F 74, an operation panel 75, and a printing mechanism 76.

The CPU 71 inputs and outputs signals to and from each unit in the printer 7 and performs various operation processing. The ROM 72 stores firmware of the printer 7. The RAM 73 is used as a work area of the CPU 71. The communication I/F 74 communicates with the main server 4 via the fourth network NW 4. The operation panel 75 is used as operation means for performing various operations. The printing mechanism 76 prints on a printing medium such as copy paper by an ink jet method, an electro-photographic method, or the like.

Figure 6:
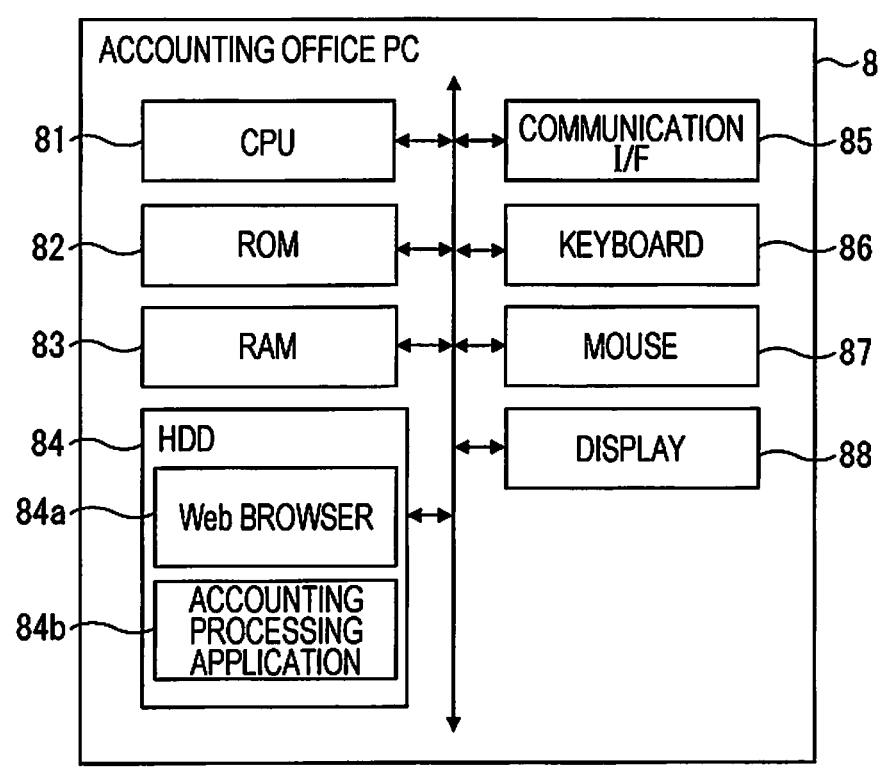
FIG. 6 is a block diagram illustrating a hardware configuration of an accounting office PC.

FIG. 6 is a block diagram illustrating a hardware configuration of the accounting office PC 8. The accounting office PC 8 includes a CPU 81, a ROM 82, a RAM 83, an HDD 84, a communication I/F 85, a keyboard 86, a mouse 87, and a display 88.

The CPU 81 inputs and outputs signals to and from each unit in the accounting office PC 8 and performs various operation processing. The ROM 82 stores programs such as the BIOS. The RAM 83 is used as a work area of the CPU 81. In addition to the OS, the HDD 84 stores a Web browser 84a, an accounting processing application 84b, and the like. The Web browser 84a is used to display a Web page (such as an operation screen for searching a voucher file). The accounting processing application 84b is used for display of the voucher file read from the voucher file DB 55b of the storage server 5, journalization processing of processing data (assignment of account items and the like), creation processing of an account book, and the like.

The communication I/F 85 communicates with the storage server 5 via the fifth network NW 5. The keyboard 86 and the mouse 87 are used as operation means for performing various operations such as an operation of the accounting processing application 84b. The display 88 is used as display means for displaying various information such as an operation screen of the accounting processing application 84b.

Figure 7:
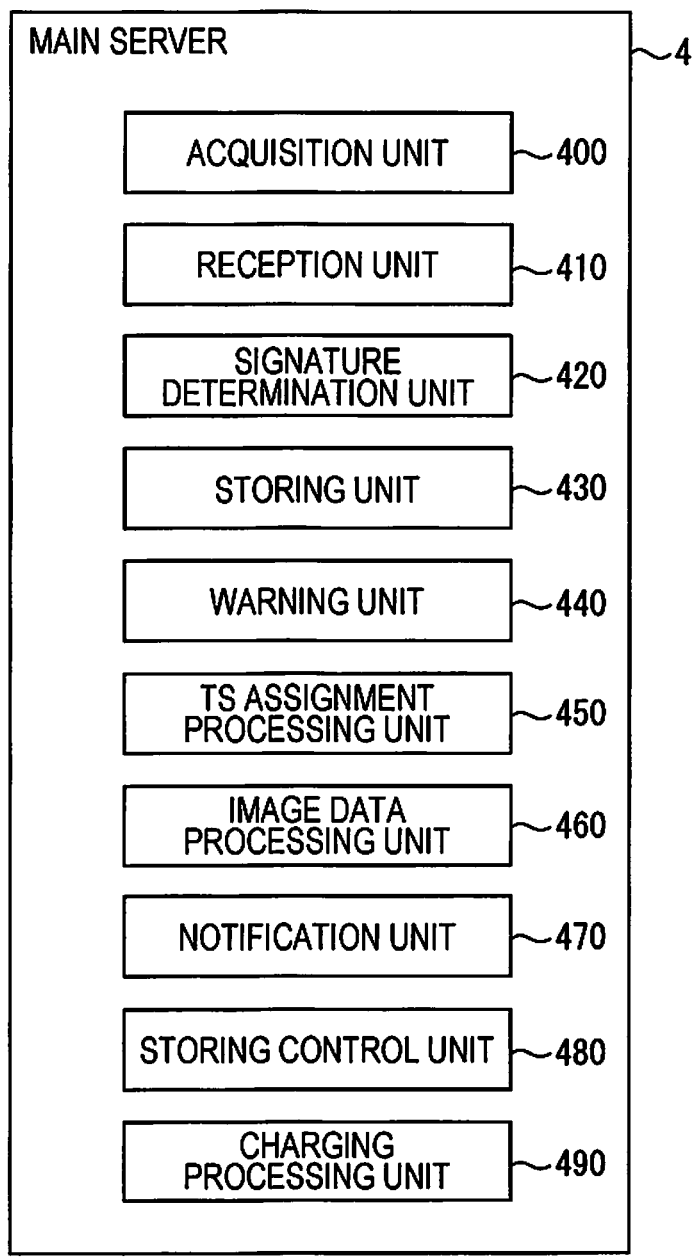
FIG. 7 is a block diagram illustrating a functional configuration of the main server.

Next, the functional configuration of the main server 4 will be described with reference to FIG. 7. The main server 4 includes an acquisition unit 400, a reception unit 410, a signature determination unit 420, a saving unit 430, a warning unit 440, a TS assignment processing unit 450, an image data processing unit 460, a notification unit 470, a storing control unit 480, and a charging processing unit 490, as functional configurations. All of these functions are realized by the CPU 41 performing operation processing based on the Web application 45a and the main program 45b. The TS assignment processing unit 450 is an example of a "processing unit" of the invention.

The acquisition unit 400 acquires (acquisition step), from the customer terminal 2, the voucher image data obtained by reading the voucher, additional information including receipt date information indicating the receipt date of the voucher, identification information (login information) of the user who provided the voucher image data.

Here, the receipt 90 which is an example of the voucher will be described with reference to FIG. 8. In the receipt 90, an address 91, a date 92, an amount of money 93, a proviso 94, issuer information 95, and a signature 96 are described. Among these items, the signature 96 is one that the recipient of the voucher filled in with his/her handwriting. The date 92 indicates the issue date of the receipt 90 and does not indicate the receipt date of the receipt 90. The receipt date of the receipt 90 is manually input by customer terminal processing to be described later (see S03 in FIG. 11).

The reception unit 410 receives designation as to whether or not to assign the TS to the voucher image data (reception step). In this embodiment, designation is received on the designation screen D1 (see FIG. 10) provided as the Web page by the main server 4. The designation screen D1 is displayed on the customer terminal 2. Not only the customer terminal 2 but also the information processing terminal other than the customer terminal 2 accessible to the main server 4 may be able to display the designation screen D1.

The signature determination unit 420 performs image analysis on the voucher image data acquired by the acquisition unit 400 and determines the presence or absence of a signature. As a determination method of the signature determination unit 420, OCR processing is performed on the voucher image data. In a case where character information other than prescribed information (in the case where the voucher is the receipt 90, the address 91, the date 92, the amount of money 93, the proviso 94, and issuer information 95, and the like) and character information satisfying a predetermined condition is included, it is conceivable to determine that the signature is "present". As the predetermined condition, it is conceivable that character information does not include Arabic numerals or that character information is a character other than a prescribed font (character regarded as handwriting). Alternatively, in advance, user's signature image data is stored in association with the user ID in the customer information DB 45d and collation of user's login information with the signature image data associated with the specified user ID may be performed, and presence or absence of signature may be determined according to the collation result. In a case where not only the signature on the front surface of the voucher but also the signature on the back surface are permitted, by statutory regulation or the like, it is preferable that the signature determination section 420 analyzes an image of two pieces of voucher image data which are obtained by reading the front surface and the back surface of the voucher, respectively, and determines the presence or absence of the signature.

In a case where the signature determination unit 420 determines that the signature is "present", the saving unit 430 stores the voucher image data and additional information acquired by the acquisition unit 400 in the voucher image data DB 45c.

The warning unit 440 issues a warning in a case where the signature determination unit 420 determines that the signature is "none" (when it is determined that there is no signature). As a warning method of the warning unit 440, for example, it is conceivable to display a warning on the operation screen of the customer terminal 2 which performed the upload operation. Alternatively, similar to the TS designation operation notification, a warning display may be performed using e-mail or the like. As a warning display, a simple error message may be displayed or a message indicating an instruction to the user, such as "Please re-upload after signing your autographed handwritten signature on a voucher", may be displayed.

In a case where the reception unit 410 receives the designation to assign the TS to the voucher image data or when the second deadline arrives, the TS assignment processing unit 450 performs TS assignment processing for assigning the TS to the voucher image data (processing step). The TS assignment processing is processing of transmitting unique information (for example, a hash value) of the voucher image data acquired by the acquisition unit 400 to the TS server 1 and issuing an assignment request, and processing of receiving TS data from the TS server 1. The TS data is a combination of unique information and time information of the voucher image data. Instead of transmitting the unique information of the voucher image data to the TS server 1 and receiving the TS data, a configuration in which the voucher image data is transmitted to the TS server 1 and the voucher image data assigned with a TS, or the TS file including the TS data and the voucher image data is received from the TS server 1 may be adopted.

The image data processing unit 460 performs OCR processing on the voucher image data acquired by the acquisition unit 400. That is, in a case where the voucher is the receipt 90, characters such as the date 92 described in the receipt 90 are converted into character codes to generate character information. The image data processing unit 460 extracts necessary character information from among character information obtained by OCR processing, and generates processing data. Here, in the case where the voucher is the receipt 90, the necessary character information is the date 92, the amount of money 93 and the issuer information 95 (see FIG. 8).

When a first deadline set for the voucher image data acquired by the acquisition unit 400 arrives in a case where the reception unit 410 does not receive the designation as to whether or not to assign the TS, the notification unit 470 notifies the user of assignment of a TS (notification step). The first deadline is set based on the receipt date information acquired by the acquisition unit 400. The notification unit 470 transmits e-mail (see FIG. 9) including access information for accessing the designation screen D1, as TS assignment notification, to the voucher image data (logging in the web page of the main server 4) to the e-mail address associated with login information of the user.

The storing control unit 480 allows the voucher file in which the voucher image data and the additional information provided from the customer terminal 2, the TS data assigned to the voucher image data and the processing data are associated with each other to be stored in the voucher file DB 55b of the storage server 5. In this case, the storing control unit 480 allows the voucher file to be stored by allowing the accounting office ID specified from the login information when the voucher image data is uploaded from the customer terminal 2 to the main server 4 and date and time information indicating the uploaded date and time to be included in the voucher file. With these configurations described above, the user of the accounting office PC 8 can search for the desired voucher file from among the voucher file DB 55b using the accounting office ID and the date and time information, and display the desired voucher file on the display 88 of the accounting office PC 8. The voucher image data is image data such as PDF, for example. The TS data and the processing data are, for example, text data.

In a case where the TS assignment processing unit 450 has performed the TS assignment processing, the charging processing unit 490 performs charging processing. In the present embodiment, as charging processing, subtraction of the points accompanying execution of the TS assignment processing from the number of remaining points of the accounting office ID specified from the login information of the user who provided the voucher image data is performed.

Figure 9:
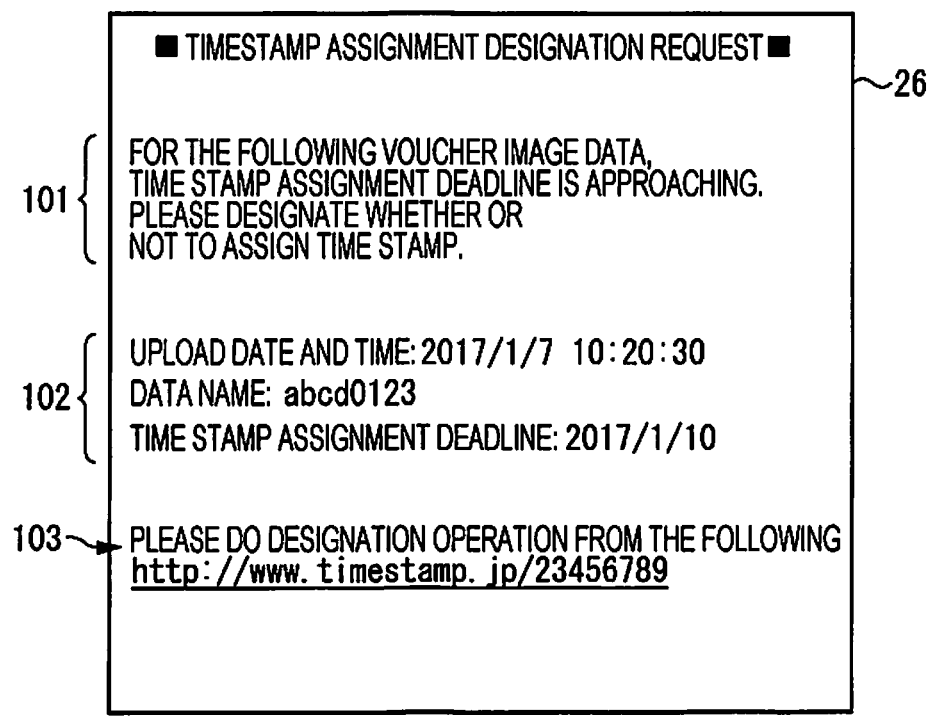
FIG. 9 is a diagram illustrating a display example of e-mail.

Next, with reference to FIG. 9, description will be made on e-mail by which TS assignment notification is performed. FIG. 9 illustrates a display example of e-mail on the touch panel 26 of the customer terminal 2. The e-mail includes a message 101 prompting an operation to designate whether or not to assign the TS to voucher image data, voucher information 102 indicating an upload date and time of the voucher image data, a data name, and a timestamp assignment deadline, and access information 103 for accessing the designation screen D1. The user can display the designation screen D1 on the touch panel 26 by selecting the uniform resource locator (URL) displayed as the access information 103.

Figure 10:
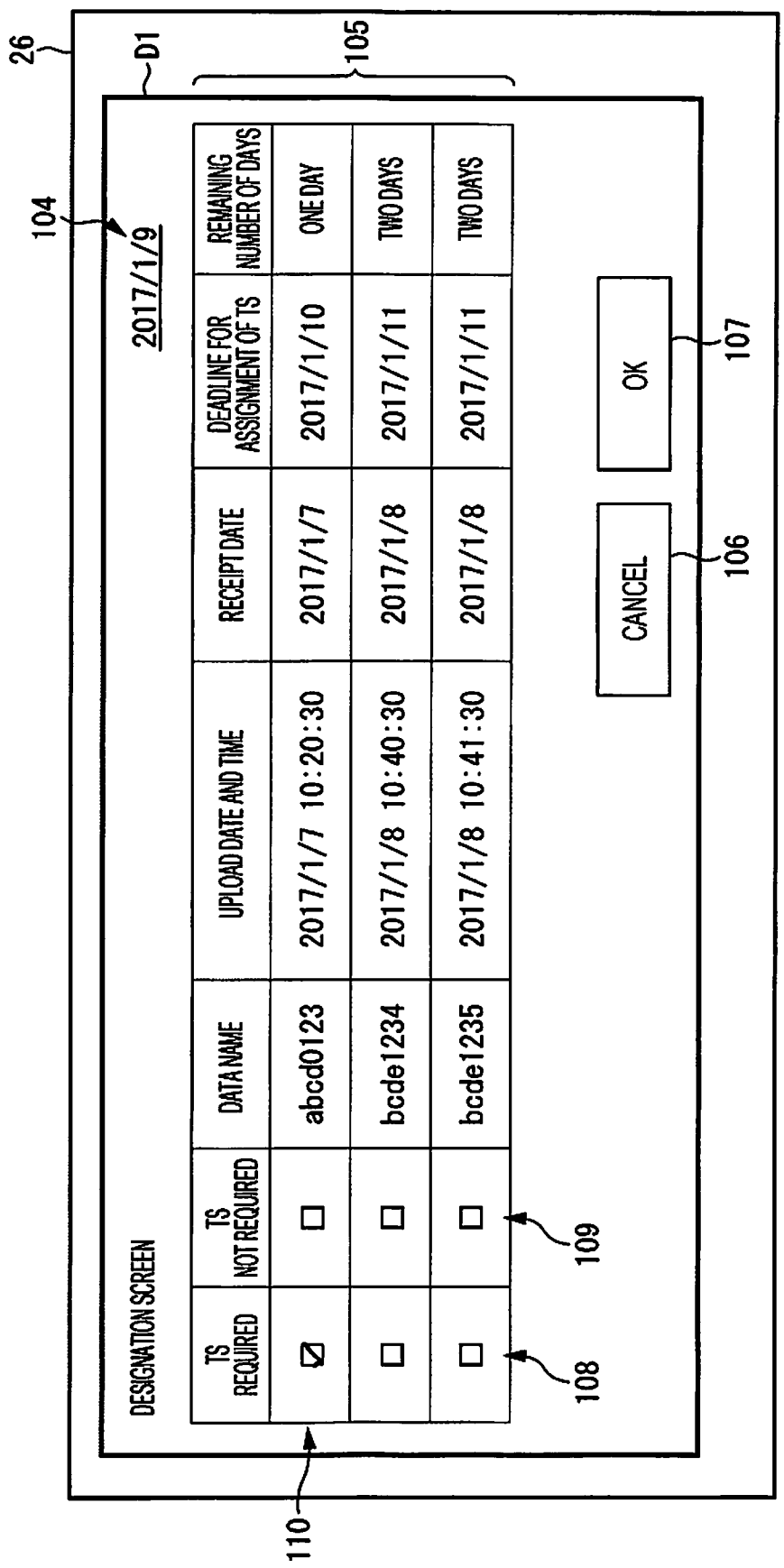
FIG. 10 is a diagram illustrating a display example of a designation screen.

FIG. 10 is a diagram illustrating a display example of the designation screen D1. FIG. 10 illustrates example in which the designation screen D1 is displayed on the touch panel 26 of the customer terminal 2. Although the entire designation screen D1 is displayed on the touch panel 26 in FIG. 10, a configuration in which a portion of the designation screen D1 is displayed on the touch panel 26 and the entirety of the designation screen D1 is recognized by the user by screen scrolling may be adopted.

The designation screen. D1 displays a current day 104, a list 105, a cancel button 106, and an OK button 107. The list 105 displays a list of voucher image data (that is, the voucher image data stored in the voucher image data DB 45c, hereinafter, referred to as "TS-required/not required-unspecified data") for which the second deadline has not arrived among the pieces of the voucher image data uploaded in the past and to which designation as to whether or not to assign the TS is not made.

The list 105 includes a first check box 108 for indicating whether or not designation for assigning a TS is made, a second check box 109 for indicating whether or not designation for not assigning a TS is made, a data name, an upload date and time, a receipt date, a TS assignment deadline, and the remaining number of days, for each TS-required/not required-unspecified data. Among these, the first check box 108 and the second check box 109 can be switched between check (designated state) and non-check (non-designated state) by touch by the user. Only one of the first check box 108 and the second check box 109 can be checked. The data name is automatically assigned when the main server 4 acquires the voucher image data. Alternatively, as a data name, the user may designate any name by operating the customer terminal 2. The upload date and time indicates the date and time when the voucher image data was uploaded from the customer terminal 2. The receipt date is displayed based on information of the receipt date of the voucher that the user entered by operating the customer terminal 2. Furthermore, the TS assignment deadline and remaining number of days are calculated based on the information of the receipt date.

For example, since the designation screen D1 of FIG. 10 is displayed on Jan. 9, 2017 (refer to the current day 104) and the TS-required/not required-unspecified data indicated by the reference numeral 110 is input by using Jan. 7, 2017 as the receipt date, the TS assignment deadline and remaining number of days are displayed as "Jan. 10, 2017" and "1 day", respectively. In the designation screen D1 of FIG. 10, designation for assigning a TS has been made (first check box 108 is checked) for TS-required/not required-unspecified data indicated by the reference numeral 110. When the cancel button 106 is selected in this state, input to the designation screen D1 (in the example of FIG. 10, designation of the first check box 108 of TS-required/not required-unspecified data indicated by the reference numeral 110) becomes invalid. Also, when the OK button 107 is selected, designation of assigning a TS to TS-required/not required-unspecified data indicated by reference numeral 110 has been made, and TS assignment processing is executed in the main server 4.

When the designation not to assign the TS is made on the designation screen D1 (in a case where the second check box 109 is checked), the main server 4 transmits target voucher image data and its additional information to the voucher image data DB 45c.

Figure 11:
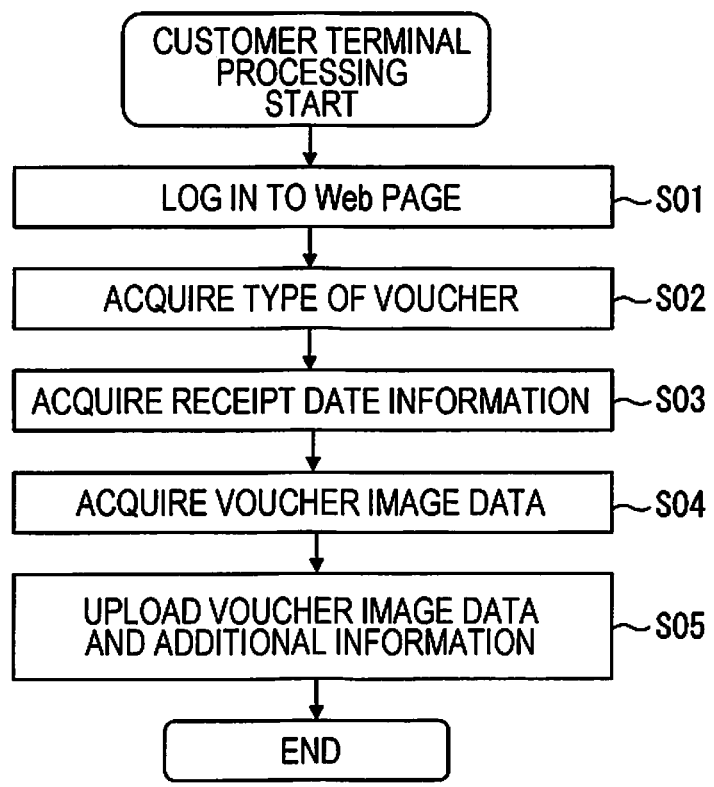
FIG. 11 is a flowchart illustrating a flow of customer terminal processing of a customer terminal.

Next, the flow of customer terminal processing by the customer terminal 2 will be described with reference to FIG. 11. The customer terminal 2 (CPU 21) logs in to the Web page of the main server 4 by inputting a user ID and password of the user (S01). The customer terminal 2 acquires a type of voucher (receipt, invoice, and the like) input according to an operation screen displayed on the Web page (S02). The customer terminal 2 acquires receipt date information input according to the operation screen (S03).

Thereafter, the customer terminal 2 acquires the voucher image data obtained by imaging the voucher by the camera module 25 (S04). When the voucher image data is acquired, the customer terminal 2 uploads the voucher image data and the additional information including the voucher type and the receipt date information to the main server 4 (S05).

Figure 12:
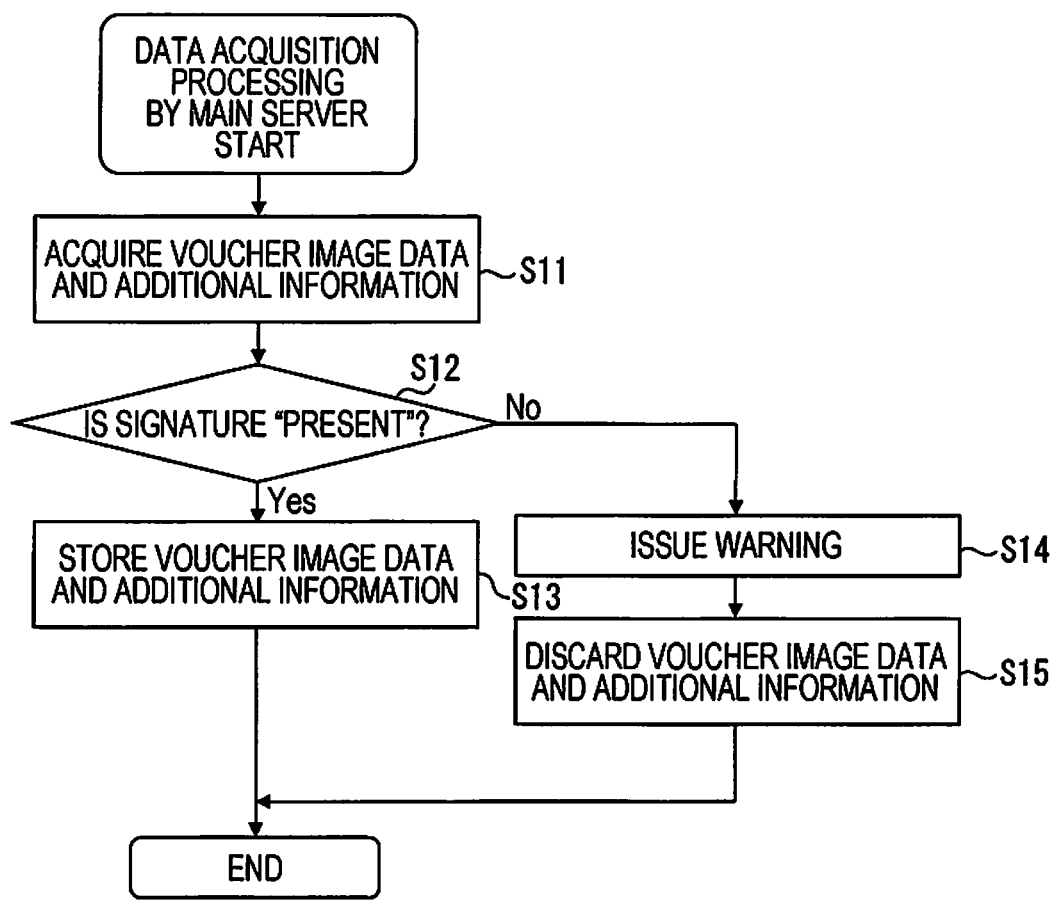
FIG. 12 is a flowchart illustrating a flow of data acquisition processing of the main server.

Next, a flow of data acquisition processing by the main server 4 will be described with reference to FIG. 12. The main server 4 (CPU 41) acquires the voucher image data uploaded from the customer terminal 2 and the additional information (S11), and determines the presence or absence of a signature (S12). In a case where it is determined that the signature is "present" (Yes in S12), the main server 4 stores the voucher image data and the additional information in the voucher image data DB 45c (S13). On the other hand, in a case where it is determined that the signature is "absent" (No in S12), the main server 4 issues a warning to the customer terminal 2 which performed the upload operation (S14) and discards the voucher image data and the additional information (S15).

Figure 13:
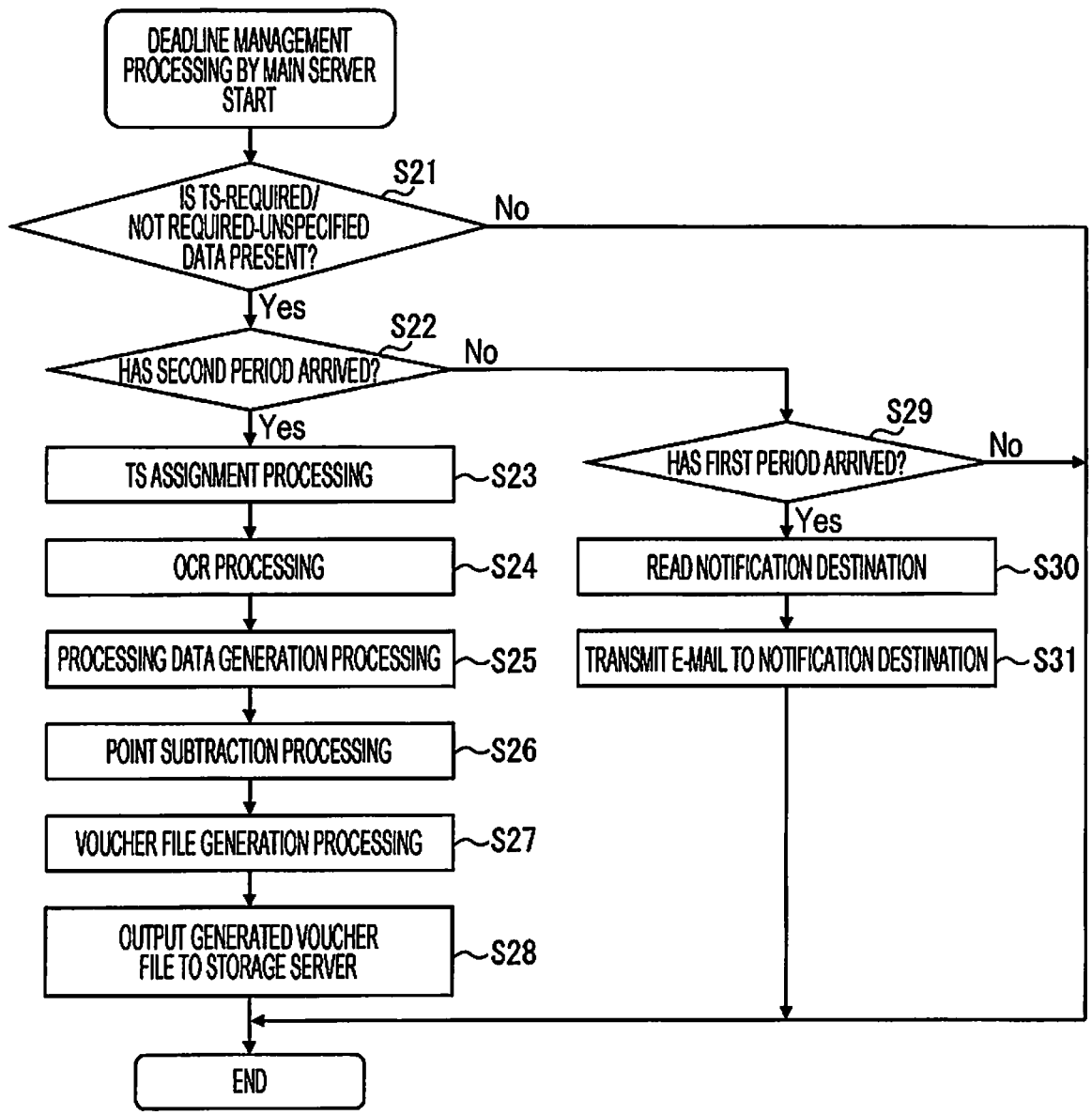
FIG. 13 is a flowchart illustrating a flow of deadline management processing of the main server.

Next, a flow of deadline management processing by the main server 4 will be described with reference to FIG. 13. This deadline management processing is executed periodically (for example, at noon every day). The main server 4 (CPU 41) refers to the voucher image data DB 45c and determines whether or not there is TS-required/not required-unspecified data (S21). In a case where it is determined that there is no TS-required/not required-unspecified data (No in S21), the deadline management processing is ended. In a case where it is determined that there is TS-required/not required-unspecified data (Yes in S21), the main server 4 determines whether or not TS-required/not required-unspecified data arriving at the second deadline (for example, noon on the third day from the day following the receipt date of the voucher) exists (S22).

In a case where it is determined that there is TS-required/not required-unspecified data arriving at the second deadline (Yes in S22), the main server 4 performs TS assignment processing on the TS-required/not required-unspecified data (voucher image data) (S23). That is, the main server 4 transmits unique information of the voucher image data to the TS server 1 to issue the TS assignment request and acquire the TS data from the TS server 1. The main server 4 performs OCR processing on the voucher image data (S24), extracts necessary information from the OCR processing result, and generates processing data (S25). The main server 4 performs subtraction processing of the points accompanying the TS assignment processing (S26). Thereafter, the main server 4 causes the voucher image data, the additional information (voucher type and receipt date information), the TS data acquired in S23, the processing data generated in S25, and the accounting firm ID specified the login information, and date and time information indicating the date and time when the voucher image data was uploaded to be associated with each other to generate the voucher file (S27). The main server 4 outputs the generated voucher file to the storage server 5 (S28) and stores the voucher file in the voucher file DB 55b.

On the other hand, in a case where it is determined that there is no TS-required/not required-unspecified data for the second deadline has arrived (No in S22), the main server 4 determines whether there is TS-required/not required-unspecified data for which the first deadline (for example, noon on the second day counting from the day following the receipt date of the voucher) has arrived (S29). In a case where it is determined that there is TS-required/not required-unspecified data for which the first deadline has arrived (Yes in S29), the main server 4 reads the notification destination (e-mail address) associated with the TS-required/not required-unspecified data for which the first deadline has arrived from the customer information DB 45d (S30), transmits the e-mail of the TS designation operation notification to the read notice destination (S31), and ends the deadline management processing. In a case where it is determined that there is no TS-required/not required-unspecified data for which the first deadline has arrived (No in S29), the main server 4 ends the deadline management processing. Although not specifically illustrated, the main server 4 also performs the TS assignment processing and the like (S23 to S28 in FIG. 13) even in a case where the designation to assign the TS is made on the designation screen D1.

As described above, when the first deadline set for the voucher image data arrives in a case where the reception unit does not receive the designation as to whether or not to assign the TS, since the main server 4 according to the present embodiment makes a TS designation operation notification for prompting the user to designate as to whether or not to assign the TS, the notified user may recognize that he/she does not make a designation. With this, it is possible to prevent the user from unintentionally passing the TS assignment deadline and eventually, it is possible to appropriately assign the TS within the TS assignment deadline.

Since the main server 4 sets the first deadline based on the receipt date information input to the customer terminal 2, the main server 4 can accurately manage the first deadline. Also, in a case where the second deadline has arrived in a state where designation for assigning the TS is not made even when a predetermined time has elapsed after the first deadline has arrived, since the main server 4 performs the TS assignment processing, it is possible to reliably prevent omission of assignment of the TS.

Since the main server 4 transmits the e-mail including the URL for accessing the designation screen D1 as the TS designation operation notification, the user can easily access the designation screen D1. Since the main server 4 stores the login information of the user and the e-mail address in association with each other in the customer information DB 45d, the user can save the trouble of designating the e-mail address for receiving the TS designation operation notification each time the voucher image data is uploaded.

In a case where the signature "none" is determined by analyzing the voucher image data and determining the presence or absence of signature, since the main server 4 issues a warning to the user, it is possible to prevent omission of signature to the voucher. Since the main server 4 performs point subtraction in a case where the TS assignment processing is performed, the voucher reading service provider operating the main server 4 can earn revenue can earn profit as a result of giving points to the accounting office.

The invention is not limited to the embodiment described above, and the following modification examples can be adopted.

Modification Example 1

In the embodiment described above, although the main server 4 sets the first deadline based on the receipt date information input to the customer terminal 2, the main server 4 may set the first deadline based on the date on which the acquisition unit 400 acquired the voucher image data. According to this configuration, it is possible to set the first deadline for the main server 4 without requiring the user's time and effort such as inputting the receipt date of the voucher. Also, it is possible to appropriately set the first deadline by providing a time limit from the time of receiving the voucher to the time of uploading of the voucher image data, such as uploading the voucher image data, on the day that the voucher was received.

Modification Example 2

In the embodiment described above, although the main server 4 determines the presence or absence of a signature by the signature determination unit 420 before the voucher image data is stored in the voucher image data DB 45c after obtaining the voucher image data (see S12 of FIG. 12), the main server 4 perform determination at another timing. For example, the presence or absence of a signature is determined for the target voucher image data at the point in time when designation for assigning a TS is made on the designation screen D1, and in a case where it is determined that the signature is "none", a warning may be issued on the designation screen D1. Furthermore, the presence or absence of signature may be determined in a case where it is determined that there is TS-required/not required-unspecified data for which the first deadline has arrived in deadline management processing (Yes in S29 of FIG. 13) and a warning may be issued by e-mail or the like (at the point in time of S31) in the case where it is determined that the signature is "none".

Further, as a further modification example, in a case where at least one of the number of pixels of the voucher image data and the document size of the voucher is prescribed by statutory regulation or the like, determination may be made on the provision prescribed items. In this case, the main server 4 includes a determination unit (not illustrated) for determining the prescribed items, and the determination unit performs determination at the same timing as the signature determination unit 420. In a case where the determination unit determines that at least one of the number of images and the document size is inappropriate, a warning is issued by the warning unit 440 to that effect.

Modification Example 3

In the embodiment described above, although the notification unit 470 notifies the TS designation operation by using the e-mail, the notification unit 470 may notify the TS designation operation on the designation screen D1, for example. The TS designation operation notification may be performed on a dedicated screen displayed by logging in to the Web page provided by the main server 4. In addition, the main program 45b of the main server 4 and the dedicated application 22b in the customer terminal 2 are interlocked, and when it is determined that the first deadline has arrived, the main server 4 may cause the customer terminal 2 to generate an electronic sound or vibration.

Modification Example 4

In the embodiment described above, the notification unit 470 may notify not only when the first deadline has arrived but also when the second deadline has arrived. That is, when the second deadline has arrived, notification of executing the TS assignment processing or notification that the TS assignment processing is executed may be made.

Modification Example 5

In the embodiment described above, in a case where the TS assignment processing is performed, although the charging processing unit 490 subtracts the point from the points given according to the money amount previously deposited, other charging methods may be adopted. For example, instead of performing the charging processing every time the TS assignment processing is performed, and billing processing may be performed every predetermined period during which the amount of money corresponding to the number of executions of the TS assignment processing in the predetermined period.

Modification Example 6

In the embodiment described above, although the reception unit 410 receives designation to assign the TS on the designation screen D1, the reception unit 410 may receive the designation to assign the TS by another method. For example, a configuration in which the voucher image data to which the TS is to be assigned is designated in the dedicated application 22b of the customer terminal 2 and the designation result is received by the reception unit 410 may be adopted. A configuration in which the customer terminal 2 can designate to assign the TS at the time of uploading the voucher image data may be adopted. In this case, after logging in to the Web page provided by the main server 4, the user of the customer terminal 2 selects one of the "TS required" for designating assignment of the TS and the "TS not required" for not designating as to whether or not to assign the TS. The customer terminal 2 includes TS designation information indicating the selection result in additional information and uploads the TS designation information to the main server 4. In the case where the TS designation information indicates the "TS required", the main server 4 performs the TS assignment processing or the like (S23 to S28 in FIG. 13) without storing the voucher image data in the voucher image data DB 45c. In a case where the TS designation information indicates the "TS not required", the main server 4 stores the voucher image data in the voucher image data DB 45c.

Modification Example 7

In the embodiment described above, although the main server 4 is illustrated as an example of the "processing apparatus" of the invention, the main server 4 may be realized by a plurality of servers. Processing of a portion of the main server 4 may be realized by an external server. For example, processing of the image data processing unit 460 may be realized by an external server. A portion (for example, customer information DB 45d) of the HDD 45 of the main server 4 may be provided in the external server.

Figure 8:
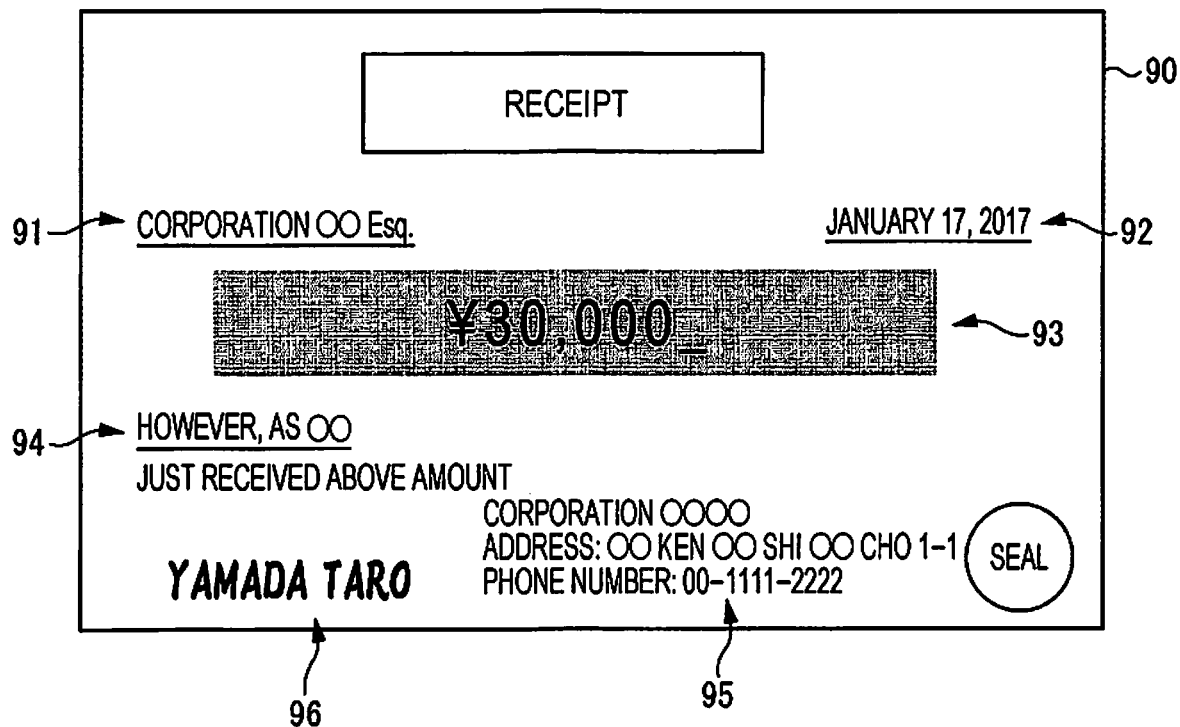
FIG. 8 is a diagram illustrating an example of a receipt.

Furthermore, as a further modification example, a configuration in which processing of the image data processing unit 460 is performed by a person and information (such as the date 92, amount of money 93, issuer information 95, and the like, see FIG. 8) extracted by a person is acquired by the main server 4 may be adopted. In this case, the main server 4 may output the voucher image data for which designation to assign the TS made to the information processing terminal operated by a person.

As a further modification example, processing of the accounting office PC 8 may be performed by the main server 4. For example, journalizing processing may be performed in the main server 4, and the journalizing processing result may be referred to by the information processing terminal connected to the main server 4.

Modification Example 8

In the embodiment described above, as the "processing apparatus", an information processing terminal such as a PC or a tablet terminal may be adopted, instead of a server. In this case, some or all of the networks NW 1 to NW 5 described above may be changed to other communication means (Bluetooth communication, infrared communication, cable connection, and the like). Similarly, an information processing terminal such as a PC may be adopted as the customer terminal 2. Also, with regard to the accounting office PC 8, an information processing terminal such as a tablet terminal may be adopted instead of a PC.

Modification Example 9

In the embodiment described above, although the customer terminal 2 captures images for each voucher by the camera module 25, it is also possible to simultaneously capture a plurality of vouchers. The customer terminal 2 may collectively upload the read results of the plurality of vouchers to the main server 4. In this case, it is preferable that the main server 4 divides and processes the read results of a plurality of vouchers into voucher image data for each voucher.

Modification Example 10

In the embodiment described above, although the voucher image data of which the image is captured by the camera module 25 of the customer terminal 2 is uploaded to the main server 4, it is also possible to upload voucher image data read by the scanner, a multifunction machine with the scanner function, or the like to the main server 4 via the customer terminal 2.

Modification Example 11

In the embodiment described above, although the acquisition unit 400 acquires the voucher image data uploaded from the customer terminal 2, an acquisition destination is not limited to the customer terminal 2. For example, the voucher image data uploaded from the customer terminal 2 may be stored in an external server communicable with the main server 4 or a storage area in the main server 4 and the stored voucher image data may be periodically acquired by the main server 4 (CPU 41). Alternatively, the main server 4 (CPU 41) may acquire voucher image data selected as a processing target by the user customer terminal 2 or the like) from the stored voucher image data.

Modification Example 12

In the deadline management processing of the embodiment described above, although the main server 4 determines arrival of the first deadline and arrival of the second deadline at the same time, the arrival may be determined at different times. That is, the time of the first deadline and the time of the second deadline may be different.

Modification Example 13

In the embodiment described above, although the designation screen D1 is accessible by selecting the e-mail access information 103 (see FIG. 9), the designation screen D1 may be accessible by other methods. For example, a configuration in which the designation screen D1 is accessible from the dedicated application 22b of the customer terminal 2 may be adopted.

Other Modification Examples

A program (Web application 45a and main program 45b) with which the CPU 41 executes each processing of the main server 4 indicated in the embodiment and modification examples described above and a computer readable recording medium (CD-ROM, flash memory card, and the like) in which the program is recorded are also included in the scope of the right of the invention. In addition, it is possible to appropriately change the invention within a range not deviating from the gist of the invention.

The entire disclosure of Japanese Patent Application No. 2017-177420, filed Sep. 15, 2017 is expressly incorporated by reference herein.

What is claimed is:

1. A processing apparatus comprising
a processor constituting:
   an acquisition unit configured to acquire voucher image data obtained by reading a voucher;
   a reception unit configured to receive designation as to whether or not to assign a timestamp to the voucher image data;
   a processing unit configured to perform processing for assigning the timestamp to the voucher image data in a case where the reception unit receives designation to assign the timestamp; and
   a notification unit configured to perform notification that prompts a user to designate as to whether or not to assign the timestamp, when a first deadline which is set for the voucher image data arrives in a case where the reception unit does not receive the designation as to whether or not to assign the timestamp,
wherein the notification unit performs the notification by transmitting e-mail including access information for accessing a designation screen for designating to assign the timestamp to the voucher image data,
the acquisition unit acquires the voucher image data and identification information of a user who provided the voucher image data,
the processor further constitutes a storing unit configured to store the identification information of the user and e-mail address in association with each other, and
the notification unit refers to the storing unit and transmits the e-mail to the e-mail address associated with the identification information of the user who provided the voucher image data.

2. The processing apparatus according to claim 1,
wherein the acquisition unit acquires the voucher image data obtained by reading the voucher and receipt date information indicating a receipt date of the voucher, and
the notification unit sets the first deadline based on the receipt date information.

3. The processing apparatus according to claim 1,
wherein the notification unit sets the first deadline based on a date on which the acquisition unit acquires the voucher image data.

4. The processing apparatus according to claim 1,
wherein when a second deadline set for the voucher image data arrives after the first deadline has arrived in a case where the reception unit does not receive designation as to whether or not to assign the timestamp, the processing unit performs processing for assigning the timestamp to the voucher image data.

5. The processing apparatus according to claim 1,
wherein in a case where the processing unit performs processing for assigning the timestamp, the processing unit includes a charging processing unit that performs charging processing.

6. The processing apparatus according to claim 1,
wherein the processor further constitutes:
an image data processing unit configured to perform processing for converting an image of the voucher image data acquired by the acquisition unit into character information.

7. A processing apparatus comprising
a processor constituting:
   an acquisition unit configured to acquire voucher image data obtained by reading a voucher;
   a reception unit configured to receive designation as to whether or not to assign a timestamp to the voucher image data;
   a processing unit configured to perform processing for assigning the timestamp to the voucher image data in a case where the reception unit receives designation to assign the timestamp; and
   a notification unit configured to perform notification that prompts a user to designate as to whether or not to assign the timestamp, when a first deadline which is set for the voucher image data arrives in a case where the reception unit does not receive the designation as to whether or not to assign the timestamp,
wherein the processor further constitutes:

a signature determination unit configured to analyze an image of the voucher image data acquired by the acquisition unit and determines the presence or absence of signature; and a warning unit configured to issue a warning in a case where it is determined that there is no signature.

8. The processing apparatus according to claim 7,
wherein the acquisition unit acquires the voucher image data obtained by reading the voucher and receipt date information indicating a receipt date of the voucher, and the notification unit sets the first deadline based on the receipt date information.

9. The processing apparatus according to claim 7,
wherein the notification unit sets the first deadline based on a date on which the acquisition unit acquires the voucher image data.

10. The processing apparatus according to claim 7,
wherein when a second deadline set for the voucher image data arrives after the first deadline has arrived in a case where the reception unit does not receive designation as to whether or not to assign the timestamp, the processing unit performs processing for assigning the timestamp to the voucher image data.

11. The processing apparatus according to claim 7,
wherein in a case where the processing unit performs processing for assigning the timestamp, the processing unit includes a charging processing unit that performs charging processing.

12. The processing apparatus according to claim 7,
wherein the processor further constitutes:
an image data processing unit configured to perform processing for converting an image of the voucher image data acquired by the acquisition unit into character information.

13. A non-transitory computer-readable recording medium that stores a process program, that when executed, causes a computer constituting a reception unit to execute a process, the process comprising:
acquiring voucher image data obtained by reading a voucher;
receiving designation as to whether or not to assign a timestamp to the voucher image data;
in the receiving, performing processing for assigning the timestamp to the voucher image data in a case where the reception unit receives designation to assign the timestamp; and
in the receiving, performing notification that prompts a user to designate as to whether or not to assign the timestamp, when a first deadline which is set for the voucher image data arrives in a case where the reception unit does not receive the designation as to whether or not to assign the timestamp,
analyzing an image of the voucher image data,
determining the presence or absence of signature, and
warning in a case where it is determined that there is no signature.

* * * * *